Patented Dec. 14, 1926.

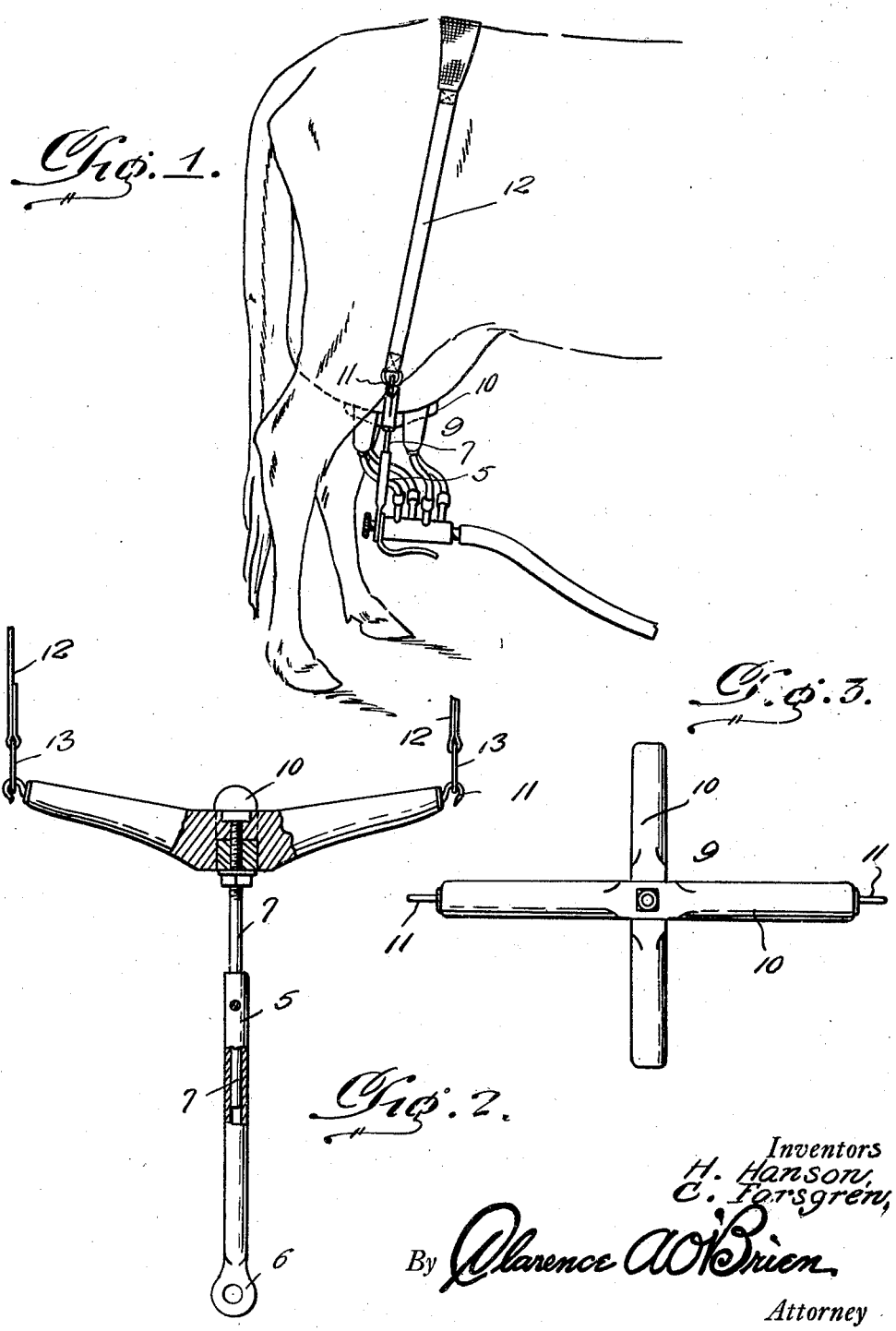

1,610,775

UNITED STATES PATENT OFFICE.

HENRY HANSON, OF ALEXANDRIA, AND CARL FORSGREN, OF NELSON, MINNESOTA.

SUPPORTING MEANS FOR THE UDDERS OF COWS AND THE TEAT CUPS OF MILKING MACHINES.

Application filed March 13, 1926. Serial No. 94,469.

This invention relates generally to milking machines of the Hinman and other type, and has more particular reference to a supporting means for the udder of a cow and the teat cups used in such milking machines.

The primary object of the invention is to provide such a support wherein the teat cups will be supported by the body of the animal being milked for taking the weight of the same from the udders and teats.

An additional object is to provide such a means which may be readily secured to the body of an animal and wherein the same may be readily adjusted to various lengths for accommodating the same to cows of various sizes.

Other objects will become apparent as the nature of the invention will be better understood, the same comprising the novel form, combination and arrangement of parts hereinafter more fully described and shown in the accompanying drawings and claimed.

In the drawing; wherein like references indicate corresponding parts throughout the several views:—

Figure 1 is a side elevation of our improved supporting means disposed in actual use, that is, supporting an udder of a cow and the teat cups of a conventional type such as are employed in the Hinman and other type milking machines.

Fig. 2 is a fragmentary elevation partly in cross section of the supporting means, per se, and Fig. 3 is a top plan view of the udder engaging yoke that constitutes an essential feature of the present invention.

Now having particular reference to the drawing, A designates a well known form of receptacle used in milking machines, that is formed with a single outlet, with which is associated a suction pipe $a$ in communication with the suction line. The teat cups associated with the receptacle are provided with a plurality of inlet nipples $b$ that are adapted to be connected to the udder teats by flexible pipes $c$. Teat cups of this type are equipped at the end opposite from the discharge end with a valve screw $d$ as disclosed in Fig. 1.

Our improved supporting means for the udder of a cow and the teat cups as disclosed constitutes the provision of a hollow bar 5 of suitable length that is flattened at one end and provided through an eye 6 with which the valve screw $d$ of said receptacle is adapted to be passed after first being removed therefrom and that will serve as a means for securing the bar thereto in a manner as disclosed in Fig. 1. Telescopically arranged within the hollow bar 5 is a solid bar 7 adapted to be adjustably secured in the hollow bar through reason of a locking screw 8, carried by the bar in the upper end thereof.

The upper end of the solid bar 7 is threaded and is adapted to extend through an opening in the center of an animal udder engaging yoke designated generally at 9. This yoke constitutes the provision of a pair of right angularly arranged interlocking bars 10 and 10' that are curved throughout their lengths as disclosed in Figs. 1 and 2 in order that the same may fit closely against the udder of the animal as disclosed also in Fig. 1.

The bar 10 is adapted to extend transversely beneath the udder of the animal and is slightly longer than the bar 10' in order that the opposite ends thereof will project slightly outward beyond the sides of the udder, said opposite ends being equipped with hooks 11—11. A suitable strap harness 12 is adapted to engage over the back of the animal and is equipped with rings 13—13 at the opposite ends thereof for engagement with the hooks 11—11 of the yoke 9. Said harness may comprise a pair of straps connected flexibly or adapted to be rigidly interconnected through medium of a buckle. However, any suitable form of harness may be employed in order to firmly engage the yoke with the udder of the animal.

It will be at once understood that by provision of the hollow and solid bars 5 and 7 the length of the support may be adjusted to adapt the same to animals of various heights while in view of the particular construction of the yoke 9 and the connecting means between said yoke and the adjustable bar, the entire support may be knocked down to facilitate the shipment or storage of the same.

Minor changes may be made in the invention without affecting the spirit and scope of the appended claims.

Having thus described our invention, what we claim as new and desire to secure by Letters Patent is:

1. In a supporting means for the manifold associated with the teat cups of milking machines, a bar adapted to be secured at one end to said manifold, and means for securing the bar at its opposite end against the udder of an animal.

2. In a support for the manifold associated with the teat cups of milking machines, an adjustable length bar, means at one end of the bar for facilitating the connection of the same to said manifold, an udder engaging yoke at the opposite end of the bar, and a harness for securing the yoke against the bottom of the udder of an animal.

3. In a support for the manifold associated with the teat cups of an animal milking machine, an adjustable length bar, means at the lower end of the bar for facilitating the attachment of the same to said manifold, a yoke secured on the upper end of the bar, said yoke being shaped to conform to the shape of the under side of the udder of an animal, and a harness adapted to extend over the back of the animal and secured to said yoke.

4. In a support for the manifold associated with the teat cups of milking machines, a pair of telescopic bars, means for securing the bars in fixed relation, means at the lower end of the lowermost bar for facilitating the attachment of the same to said manifold, an udder engaging yoke secured to the upper end of the other bar, and a harness adapted to extend over the back of the animal for holding the yoke against the udder.

5. In a support for the manifold associated with the teat cups of milking machines, a tubular member having its lower end flattened and provided with an eye to facilitate the attachment of the tubular member at its lower end to said manifold, a rod slidable in the upper open end of said tubular member, means for adjustably securing the rod in the tubular member, an udder engaging yoke carried by the upper end of said rod, and a harness adapted to extend over the back of the animal for holding the yoke against the bottom of the udder.

6. In a supporting means for the udder of a cow and the manifold associated with the teat cups of milking machines, a bar adapted to be secured at its lower end to said manifold, an udder engaging yoke carried by the upper end of said bar, said yoke comprising a pair of intersecting cross bars shaped to conform with the bottom of the udder, and a harness adapted to extend over the back of the animal and for holding the yoke against said udder.

In testimony whereof we affix our signatures.

HENRY HANSON.
CARL FORSGREN.